United States Patent [19]

Michaels et al.

[11] 4,166,275
[45] Aug. 28, 1979

[54] LORAN RECEIVER SYSTEM

[75] Inventors: Sheldon B. Michaels, Sudbury; Otis Philbrick, Westwood; Jeffrey Morris, Dedham, all of Mass.

[73] Assignee: Digital Marine Electronics Corporation, Beford, Mass.

[21] Appl. No.: 825,656

[22] Filed: Aug. 18, 1977

[51] Int. Cl.² .............................................. G01S 1/24
[52] U.S. Cl. .................................... 343/103; 178/69.1; 325/58
[58] Field of Search ....................... 343/103; 178/69.1; 325/58

[56] References Cited

U.S. PATENT DOCUMENTS

| 3,325,810 | 6/1967 | Frank et al. | 343/103 |
| 3,701,018 | 10/1972 | Groth, Jr. | 343/103 X |
| 3,934,254 | 1/1976 | Vogeler et al. | 343/103 |

Primary Examiner—Maynard R. Wilbur
Assistant Examiner—Richard E. Berger
Attorney, Agent, or Firm—Robert T. Dunn

[57] ABSTRACT

In a Loran Receiver that receives radio frequency (RF) signals from a master beacon and at least two slave beacons (also called secondary transmitters) and converts the received signals into hyperbolic coordinates that locate the position of the receiver with respect to the beacons and a programmed computer controls modes and sequences of operation of the system, these modes being generally the beacon pulse search mode, front edge/zero crossing location mode and the zero crossing track mode, received beacon pulses are searched and identified by the following technique: all received signals are repeatedly sampled at the beacon group repetition interval (GRI) in a regular sampling pattern in which the sampling rate is greater than the beacon pulse rate, each sample interval being only a small portion of a beacon pulse RF excursion; the samples are hard limited and assigned a value of plus or minus, depending upon whether they exceed a threshold, and these plus-minus patterns are accumulated over many GRIs and stored; the stored accumulation is analyzed according to the computer program and compared with a reference pattern; and when there is correlation within programmed conditions, the front edge/zero crossing location mode is then pursued to locate the samples at the zero crossing of a particular RF excursion of the tracked beacon pulses.

33 Claims, 18 Drawing Figures

Fig. 1.

Fig. 2a. (PHASE A)

Fig. 2b. (PHASE B)

LORAN RECEIVER SYSTEM

BACKGROUND OF THE INVENTION

This invention relates to Loran Navigation Systems.

The present Loran C Navigation System provides a master transmitter and beacon and at least two secondary transmitters and beacons, also called slave beacons, as a complete chain identified by the repetition interval (GRI) of groups of radio frequency (RF) pulses from the beacons. All three beacons in a given chain operate at the same (GRI). The beacon pulses are accurately timed and phase coded for identification. Both the master and slave pulses are propagated as ground waves and as sky waves and all these signals as well as noise are detected by a Loran receiver antenna. The general purpose of the Loran Reciever is to measure the times of arrival of the two slave groups relative to the time of arrival of the master group and produce time differences, sometimes called TD1 and TD2 that identify hyperbolic coordinates on a map that intersect at the receiving antenna. Clearly, the more accurate TD1 and TD2 are computed, the more precise will be the determination of the position of the receiver on the map. Also, it is an advantage that the received signals be acquired rapidly and the measurement of of TD1 and TD2 be done quickly, particularly when the craft carrying the receiver is moving at high speed.

SUMMARY OF THE INVENTION

The basic techniques of the present invention are applied to an integrated Loran C Reciever Computer system that includes four major parts: the radio frequency receiver; the signal sampler; the computer and programmed memory; and the operator's controls and displays, also called the front panel. The function of the receiver is to process the incoming Loran signals and provide "envelope" and "cycle" signals to be sampled by the signal sampler. The signal sampler samples the processed signals from the receiver, compares them with reference signals from the computer according to the computer program and feeds the resulting pattern to an accumulator. The computer stores reference signals and program and analyzes the accumulation to decide the modes of operation and finally computes TD1 and TD2. The overall operation does the following:

1. Search by sampling received signals for the master and two slaves beacon pulses and synchronize the sampling pulses with these signals;
2. Find the front edge and the third RF excursion zero crossing of the master and each of the slave pulses received.
3. Track said zero crossings of the beacon and slave pulses; and
4. Compute TD1 and TD2 and energize and control the front panel display.

The transmitted pulse groups from the master and two slave beacons are all at the same GRI. All three beacons transmit successive patterns of pulses, which are bursts of RF, at the same GRI. For example, each successive pattern of pulses from the master beacon, called a master pulse group, includes nine equally spaced pulses, whereas each successive pattern of pulses from a slave beacon, called a slave pulse group, includes eight successive pulses. In addition, the master group is phase coded different from the slaves and successive groups of the master are phase coded different from each other and the same is true of successive groups of the slaves. In the present invention, the master is distinguished from the slaves by a different phase coding of the groups and the slaves are distinguished from each other only by their approximate times of arrival. For example, once the master and both slaves are being tracked, a TD1 and a TD2 can be determined and knowledge of the general location of the receiving antenna is all that is necessary to determine which slave is TD1 and which is TD2.

Clearly, the foremost function of the Loran Receiver System is to identify and track the master and slave groups as quickly and accurately as possible and, in fact, track the zero crossing of a particular RF cycle of the pulses. All this must be accomplished continually in the worst weather conditions on a craft often hundreds and even thousands of miles from the beacons where signal to noise ratio can be very low. The several features of the present invention are combined to provide this performance.

In accordance with the present invention, the receiver provides two outputs: a modified envelope output and a modified cycle output. The modified envelope output is the received beacon pulses limited so that all RF excursions of the pulses are even square waves. Thus, each pulse of RF is a pulse set of square waves of plus or minus phase and the pulse group is a group of sets of square waves that define the GRI phase code, also called the envelope code, distinguished from the cycle code which is described next.

The cycle output of the receiver is the received beacon pulses each delayed one half cycle of the RF, added to itself and then limited. Due to the very particular contour of the envelope of the pulse of RF (this envelope is very carefully maintained by the beacons), the result is a pulse set of square wave with a phase reversal in the middle of a pulse. Thus, the receiver produces envelope and cycle outputs each revealing the time location of the pulses of RF, the GRI phase code that distinguishes the successive groups of master pulses from each other, the successive groups of slave pulses from each other and the master from the slaves. In addition, the cycle output reveals at the phase reversal the time location within the a pulse of the end of a particular RF cycle, designated the third cycle.

In the present invention, the above described receiver outputs, read only memories (ROMs) in the system and the operator's interrogation inputs are the inputs to a novel computer that searches, finds and tracks the received master and slave beacon pulses, tracking the pulses at the end of the third RF cycle zero crossing of each pulse. When tracking criteria is met as dictated by stored programs in the system, the TD1 and TD2 values are computed and displayed to the user.

A novel technique applied to both the envelope and cycle outputs of the receiver samples these outputs continually over each GRI. The sampling is done at twice the pulse rate and the sample intervals span only a few degrees of phase of the RF. Thus, a sample occurring where there is no beacon pulse is merely a sample of noise; a sample occuring at a positive RF excursion of a beacon pulse is a + sample and a sample occurring at a negative excursion of a beacon pulse is a − sample. In the present invention, these samples are treated in a novel way to gather more information from them than is apparent. The technique is described below.

Each sample is treated as a member of n sets and so n times the information is gathered that would have been available had each sample been used in only one set. This is done by accumulating the samples over many GRI's and distributing the samples to positions in an accumulator that correspond to an hypothezized set. It the hypothesized set is correct, then the accumulation will be in accordance with a recognized pattern and this will indicate that the samples are tracking the received beacon pulses at precisely the correct point, which is (the zero crossing at the end of the third cycle of RF in each pulse). This is the criteria for tracking and when it is met, TD1 and TD2 are computed and displayed. Clearly, the purpose of this technique is to increase speed ane reliability of the system in arriving at the tracking criteria.

Another novel technique employed in the present invention enables rapid accurate cycle selection (identification of the thrid cycle zero crossing). A cycle output from the receiver that corresponds to a beacon pulse, as already mentioned, is a pulse set of square waves at the time location of the beacon pulse, the set of square waves showing a phase reversal that should be at the end of the third RF cycle of the beacon pulse. These patterns are detected and accumulated according to the technique described above and then examined by the computer. The patterns that are looked for have the following forms:

+X−+−+−+

+−+−+X−+
+−+X−+−+ in which the phase reversal occurs at the X.

The first pattern above shows that the tracking samples are taken slightly early, the second slightly late and the third right at the center of the successive beacon pulses. If the accumulators are not found to contain any of the above patterns, then search must continue.

The first novel technique described above greatly increases the use of each sample. The technique is implemented in both envelope and cycle detection using a random access memory (RAM) that is loaded with sequential GRI programs, a binary counter that addresses the RAM and is driven by clock signals, and means for comparing the receiver output signals with the pattern output from the RAM and accumulating the result in a shift register.

It is the principle object of the present invention to provide an integrated receiver and computer for a Loran navigation system performing hyperbolic coordinate conversion from conventional Loran signals.

It is another object to provide an integrated receiver and computer for receiving Loran beacon signals and performing hyperbolic coordinate conversion whereby the receiver is located with respect to the beacons.

It is a more particular object to provide an improved Loran C receiver using a programmed computer to control electronic apparatus that processes received Loran beacon signals and tracks the received signals to reveal TD1 and TD2 information for determining hyperbolic coordinate location of the receiver.

It is another object in conjunction with the above to provide an integrated Loran C receiver and computer wherein envelope and cycle information signals derived from the received Loran beacon signals are used effectively to search and track the signals according to prescribed objectives.

These and other features and objects of the present invention are apparent from the following description of embodiments of the invention taken into conjunction with the drawings.

DESCRIPTION OF THE DRAWINGS

FIGS. 6a, b, c and d show an RF burst as received and having the prescribed envelope, the delayed the pulse, the result of delay and adding and the limited envelope output signal from the receiver, respectively;

EMBODIMENTS OF THE INVENTION

Search Technique

In Loran beacon signals there are groups of n components (eight) occurring exactly x seconds (one millisecond) apart. The groups occur y seconds (the GRI) apart. These components may be characterized by a property called phase. An input is comprised of two series of signal groups added noisy values that obscure the phase properties of the signal. In order for the device to synchronize itself to the signals it must first locate the signals by searching for them at its input. The present invention involves a unique technique and process of searching for the beacon signals.

The method assumes that there is some system outside the scope of the search system to ascertain the phase property of the input at any desired time. It is known that noise components occurring within the signal having known probability p of causing an erroneously + phase indication. It is assumed that pn varies only very slowly over the course of the search.

The presence of a signal component within the input will be characterized by a value psn which differs from pn in a series dependent, in general, on external factors. What is known, however, is that there is some value $\Delta$ pt which is the minimum difference in probability for a signal which is on the threshold of useability and which is independent of external factors. An external method is assumed to exist which can associate two sets of input samples, taken at different times, with each other.

In the present invention, apparatus is provided to utilize each input sample as a member of n sets. Thus, this device can gather n times the information which would have been available had each sample been used in only one set. Each sample taken is evaluated as a member of the set of points comprising signals whose 1st, 2nd nth components occur at the sample time. Each sample is modified, then distributed to the set accumulator corresponding to its hypothesized set. The modification consists of applying the inverse phase property to any sample which is thought to be of minus phase value. Since the phase property of the signal is already known for each of the n components, and since the sets are formed on the assumptions of component numbers, the modification may be applied unambiguously. Furthermore, since groups of components occur every y seconds, the set accumulators get n new values every y seconds. If the total number accumulated is called N and it is given that there is a certain desired false alarm rate (false alarm is an erroneous indication that a signal has been detected in a certain set accumulator), there is a function f which may be postulated from N. Thus, F = f(N). F is chosen to be the probability value $\Delta$p which may be observed in the set accumulator in order that two false alarms be not given with a set of n samples of a signal inverse probability of less than psn.

In the case of a Loran signal searcher, the signal and noise are derived from a radio receiver of appropriate response as a function of frequency. The signal and noise are hard limited by an AC coupled device, that in effect, assigns the value $-$ to input quantities less than zero volts and $+$ to quantities greater than zero volts. The sampling device may be a crystal clocked counter whose output is continuously compared to the output of a device which has stored the controllers desired comparative value. This device need have no more capacity than y divided by the clock resolution. For instance, a 20 bit digital counter will conveniently suffice for 5MHz samples with y greater 0.1 seconds.

A request for search function may be implemented by a digital computer which can pass appropriate parameters. The controller may be implemented by a digital computer and the sequencer may be implemented by a read only memory (ROM) which contains instructions for the controller to execute. The counter for N is a read/write memory location in a random access memory (RAM) which is added to the controller every time a new input sample is taken and whose contents represent N as a binary number. Phase as a function of component number in a group may be determined by a "request for search" by passing a particular phase code to the controller which stores it in the read/write memory. In a Loran system, the 8 component phases of a burst of pulses can be conveniently stored as 8 bits in a single memory location for which a + phase is desigated by a $-$ one bit and a phase is designated as a zero bit.

The set accumulator may be a read/write memory location in a purely digital system or it could be analog integrators in a hybrid digital/analog system. Phase correction is accomplished by reading the bit of phase associated with a particular set. For example, let a particular memory location accumulate the number of correct input phases times iy+j+k. Here, y is the group interval, i is one to N, j is the offset and k is the component number. More particularly in regard to Loran C, y is the repetition interval (GRI), j is the time difference set being evaluated and K is the set of integers 0 through 7 times the 1,000 microsecond interval between two Loran pulses. There are then 8 different set accumulators for which this specified time sample is a set number.

The set accumulator which k=0 will have the 0th bit of the stored phase code used by the correction. The set accumulator for which k=1 will have the 1st bit of the stored phase code used and it follows similarly for the other six accumulators. It should by noted that because the s amplitude supletive is iy+j+k, as k increases, j decreases an identical amount. This fact is interpreted by the "set identifier" in order to terminate the search by specifying the location of the 0th component of the pulse group. The operation of the phase corrector is particularly easily implemented in integrated circuit form or stored program form. For each input sample taken, the 8 bits of the phase code are each applied in turn by the following rules:

1. If the phase code is a one and the input sample is one, increase the accumulated value by one.
2. If the phase code is one and the input sample is zero, decrease the accumulated value by one.
3. If the phase code is zero and the input sample is one, decrease the accumulated value by one.
4. If the phase code is zero and the input sample is zero, increment the accumulated value by one.

Thus the one or zero value sampled may be used to either compliment or not compliment the phase code binary representation and then, the resultant successive bits are used to specify the successive repetitions of either increment or decrement to the successive set accumulators.

Of course, the operations could be modified to increment versus not increment. In that case, one could decrement results by pxn at convenient intervals. This result is convenient, because for p=0.5, the expected value in the set accumulators is 0. Thus, a small number of bits, for instance, eight, may accumulate data for a large number of samples, for instance 2048. In fact, the accumulated number may be evaluated as a probability simply by taking the number, dividing by N and adding 0.5. This relation is used by the accumulator evaluator to determine a value of p which may be compared with F to determine the presence or absence of a signal of specified probability, psn, with a reliability inherent in the choice of F.

The factor F may be chosen empirically or theoretically or by a combination of both. For instance, if the noise is assumed to be equally distributed, then one could assume the Binomial distribution of samples. Then one could construct a table of the number of correct phase values (+'s) required for the signal detection. To do this one could assume p=0.5, a false alarm probability of 0.0001 and then evaluate the required number of +'s accumulated such that:

$$(+'s - Np)/\sqrt{Np(1-p)} > x$$

where x has been evaluated as:

$$\phi(x) = 1/\sqrt{2\pi} \int_0^x e^{t^2/2} \cdot dt$$

according to standard methods to yield a probability much less than 0.0001.

Continuous or even occasional evaluation of set accumulators for values exceeding F results in a detection process which will succeed in an optimally short period of time. All data taken is useable in the detection of n possible signal locations. A computation of F may be tabulated or concurrently calculated and may be adjusted at will to give desired false alarm versus detection speed characteristics.

Cycle Selection Technique

The technique used for cycle selection in accordance with the present invention is unique inasmuch as it does not attempt to track a particular point of a noisy Loran signal. The techniques advantge is that it allows data from portions of a Loran signal to be integrated in a manner allowing techniques of pattern recognition to be applied. A further advantage is that there exists at all times and reliability measure which provides a solid theoretical basis for telling or informing the operator when the acquired data pattern is reliably accurate.

In a Loran C system, a sampling method is used on the hardlimited cycle output of the receiver to track a zero crossing of the RF pulses. The envelope information is contained in the cycle output of the receiver which is comprised of the hard-limited output of a standard delay amplify and add circuit. For such a properly adjusted circuit and, if the received envelope to cycle discrepancy of the signal is zero, samples of the envelope output of the receiver are optimally placed, if they occur at positions where the instantaneous signal energy is maximum. These positions occur at times as follows:

$$t_z \pm (2.5 + 5i)_{t=0 \text{ to } 0}$$

where a tz is the time of the zero crossing. If a practical limit is set on i, then sets of samples can be integrated at these times into storage. For instance, if i=3, then eight storage devices are needed which can be either digital or analog. A characteristic of the delay-amplify-add circuit output with no noise on the signal is that it is in-phase with the cycle information on one side of the proper zero crossing and out of phase on the other side. The addition of noise dilutes this information.

If a noise free envelope channel is sampled in this way, then one can observe a pattern of + phase alternating with − phase on one side of the desired track point, and − phase alternating with + phase on the other side. Depending on the acutal envelope-to-cycle discrepancy, the phase may be either +, − or neither at the actual track point. According to the present invention, the envelope channel is sampled at specified times and a phase code correction is applied according to the known transmitted phase and the resulting values are integrated into accumulators. Simultaneously, a count is determined which indicates how many samples have been taken. Alternatively, the count may be estimated from the average value in successive accumulators.

Then, just about any convenient pattern recognition technique can be applied to look for the characteristic expected pattern. In embodiments of the present invention, the pattern is expected to look like:

+ − + X − + − + where each sybol represents the value accumulated in one signal location related to the remaining values. Thus, a + symbol means that the integrated value is greater than the average value of the local part of the data. The − symbol indicates a lower than average value and X indicates that we don't care and can't predict whether +, − or 0 should be present. Data is continuously integrated into these buffers. An asynchronous device concurrently scans the buffers looking for patterns in the form of:

+ X − + − + − +

+ − + − + X − +

+ − + X − + − +

In the present invention implementation of this uses a digital computer to investigate random access memory buffers, however, it should be noted that other devices including analog storage, comparators, filters, etc., may be used for the same implementation.

If the buffers are not found to contain any of the appropriate pattern, a warning is activated. If on the other hand, the buffers contain the pattern + − + X − + − + the warning indicator may be deactivated. If the buffers contain the patterns which have the X element displaced +10μs, the tracking point should be moved a like amount in the same direction.

The pattern recognition device may utilize the number of samples taken, counted as an input to determine thresholds of statistical certainty for purposes of obtaining relatively constant false signal rates as a function of signal to noise ratio.

Advantages of the above described technique are the following:

(1) High signal amplitude portions of the signal are used, avoiding excessive information degradation by noise.
(2) Multiple samples of each signal component compress the effective noise sample component.
(3) All information is stored permanently without a time constant, so that inferred signal information has increased confidence.
(4) 2 point movement may be probabilistic in nature, allowing for rapid movement with strong signals and slower movement with weaker signals.

LORAN C BEACON SIGNALS

Figure 1:
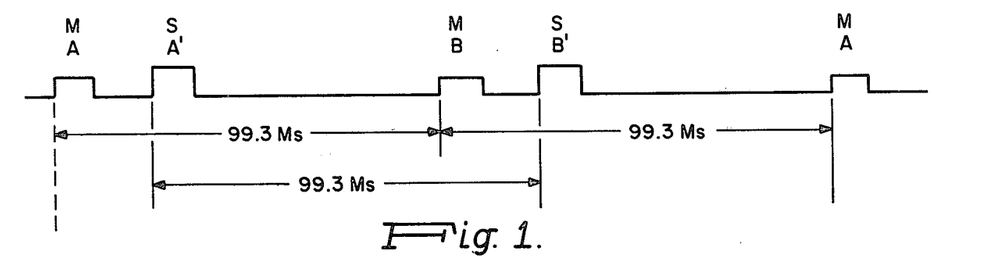
FIG. 1 is a signal diagram showing the time positions of the master and a slave beacon signals at a receiver in a typical case over two GRIs.
Figure 2A:
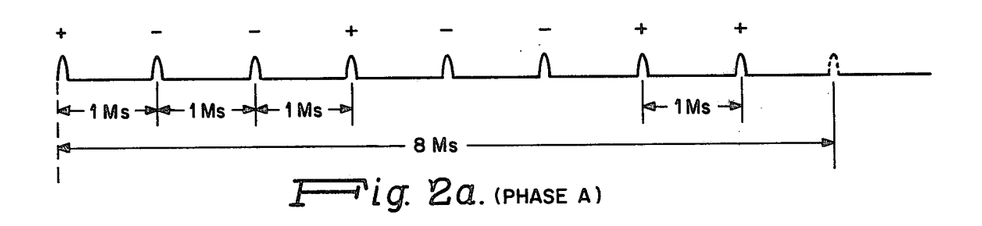
FIGS. 2a and 2b are signal diagrams of sets of bursts of the master beacon signals showing the set or group phase coding.
Figure 2B:
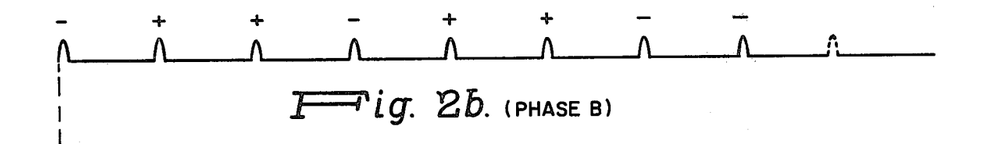
Figure 3:
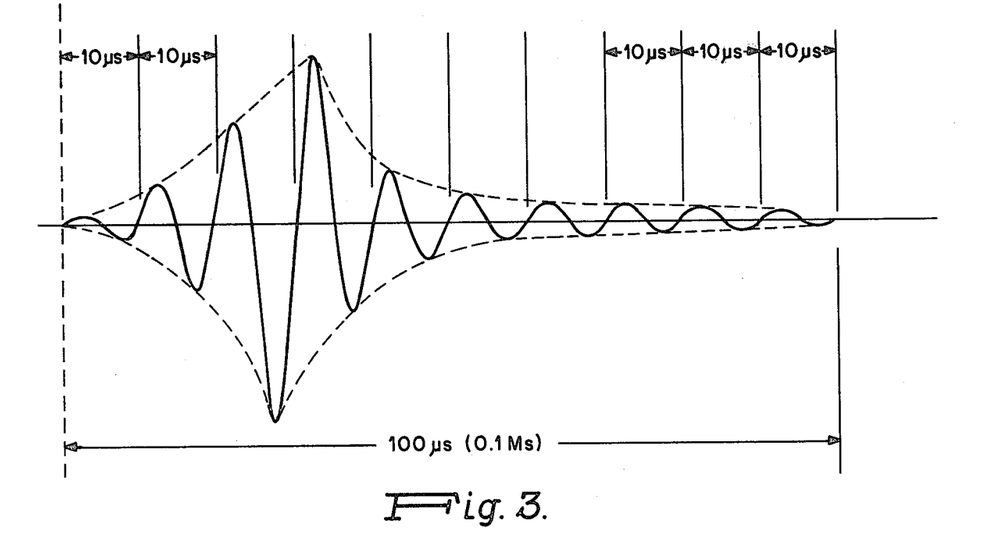
FIG. 3 is a wave form diagram illustrating a typical pulse of RF from a master or a slave beacon.

The FIGS. 1, 2, 3 illustrate LORAC C beacon signals. As shown in FIG. 1, both master and slave beacon signals consist of groups of pulses of RF repeated at the GRI. The groups of master pulses are designated as alternately phase A and phase B. Similarly, the pulse groups from a slave beacon are repeated at the GRI and are alternately designated phase A' and phase B'. The timing of the signal and the distance between the beacons is always such that at any location of a receiver, the slave phase A' always follows the master phase A, before the next master signal (phase B) arrives. The pulse group intervals (GRI) is precisely the same for the master and the slave. It is 99.3 Ms.

A master slave group of phase A and the following master group of phase B are illustrated by FIGS. 2a and 2b. Each pulse group consists of eight pulses of RF separated by 1 Ms (1000μs) The phase coding of the group A pulses, shown in FIG. 2a is + — — + — — +. The Master group at phase B shown in FIG. 2b is the inverse, it is — + + — + + — —. This phase coding, of course, is imposed at the transmitter and has the purpose of distinguishing the master pulse groups from the slave pulse groups, and also distinguishing each master pulse group from the following master pulse group.

A typical RF pulse of + phase is shown by the wave form of FIG. 3. The pulse is 100μs long and contains 10 cycles of RF. Hence each cycle of RF is 10μs long and so, the RF frequency is 100 KHz. The envelope of the pulse, indicated by the broken lines in the figure, is carefully tailored at the beacon so that the envelope peak at the end of the third cycle of RF of the pulse, can be identified by delaying the pulse and then adding it to itself. This is the well known delay-amplify-add technique for identifying the end of the third cycle of RF of the pulse.

SAMPLING TECHNIQUE

Figure 4A:
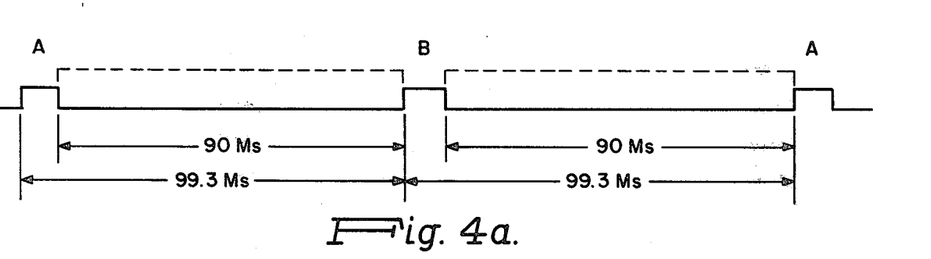
FIGS. 4a and 4b are signal diagrams showing the master signals over two GRIs and the sample intervals over two GRIs, the sample intervals being shown at two positions, an initial and a shifted position.
Figure 4B:
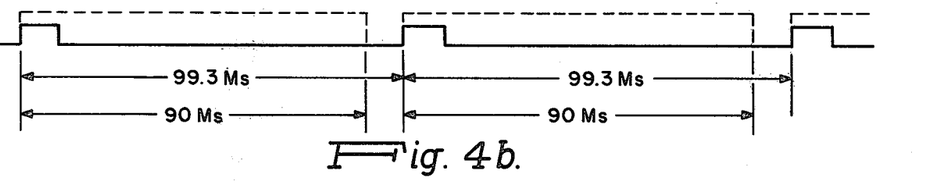

Nearly the whole interval of each GRI is sampled by very narrow pulses, a few nanoseconds long, each 0.5 Ms over 90 Ms of each GRI. This is shown by FIGS. 4a and 4b. FIG. 4a shows the location of successive Master pulse groups of successive phases A and B overlain by the 90 Ms interval, so placed that it just misses the pulse groups. The FIG. 4b shows the same Master pulse groups overlain by the search interval, shifted 10 Ms so that the search interval just hits the pulse groups.

Figure 5A:
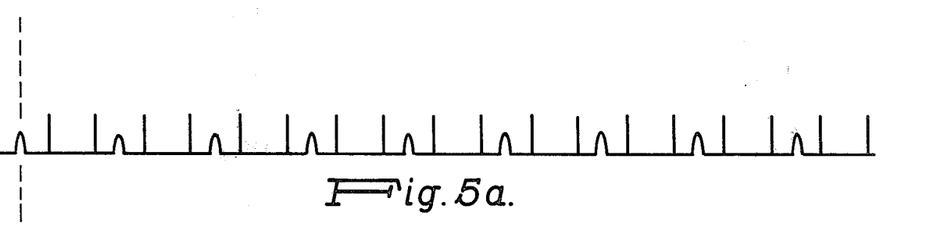
FIGS. 5a and 5b are signal diagrams showing a set of bursts of beacon signals in which the regular sample intervals do not hit the signals and then shifted so that alternate samples hit the signals, respectively.
Figure 5B:
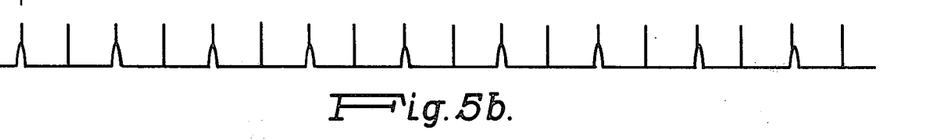

A pulse group hit by the search interval is shown in FIGS. 5a and 5b. In FIG. 5a, the samples of a few nanoseconds, 0.5 Ms apart all miss the pulses of the group and so they sample only noise. However, in FIG. 5 the samples have been shifted a few hundred μs and so every other sample hits a pulse of the group and when this occurs, the accumulated information begins to show the presence of the beacon signal.

FIGS. 4a and b and FIGS. 5a and b illustrate the two step process of searching for the beacon signal. The 90 Ms interval during a GRI includes 180 samples. In embodiments of the present invention 166 of the 180 samples are accumulated, each in an eight stage register (also called an accumulator). Hence, the accumulator is a bank of 166 eight stage registers. According to one suitable procedure, the samples are accumulated over two GRI's and if any kind of pattern shows up, the search interval shifts as necessary to place the pattern at the front end of the interval.

On the other hand, if no pattern shows up, then the whole interval is shifted 10 Ms, samples are accumulated for another two GRI's and again the accumulation is examined for the pattern. If the pattern does not show up at this point, then the search interval is shifted two μs for two GRI's and again the accumulation is examined for the desired pattern. Thereafter, several shifts of 0.5 Ms are made and samples accumulated over two GRI's until the pattern and phase code of the pattern is clearly identified. When the pattern and its phase code are clearly identified, the front edge/zero crossing location mode begins.

FRONT EDGE/ZERO CROSSING LOCATION

Figures 6A, 6B:
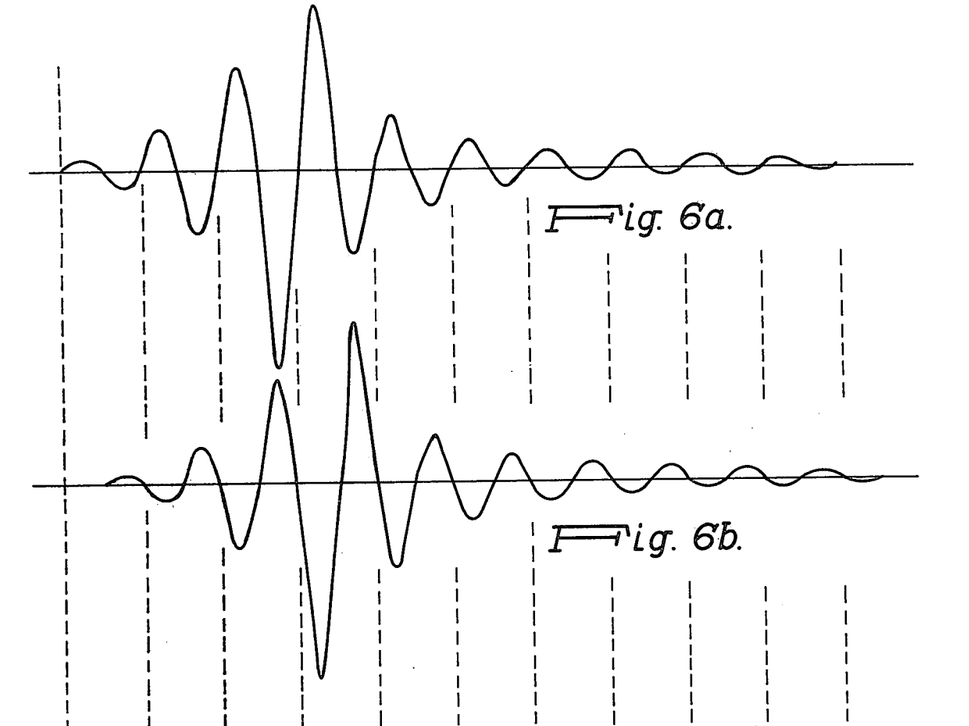
Figure 6C:
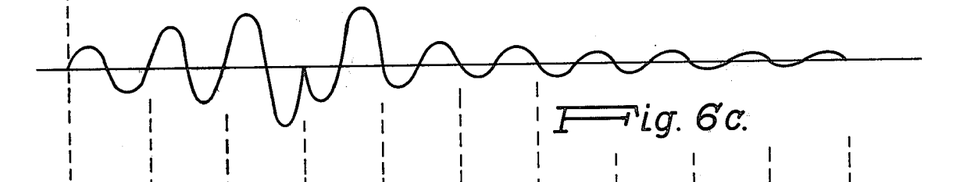
Figure 6D:
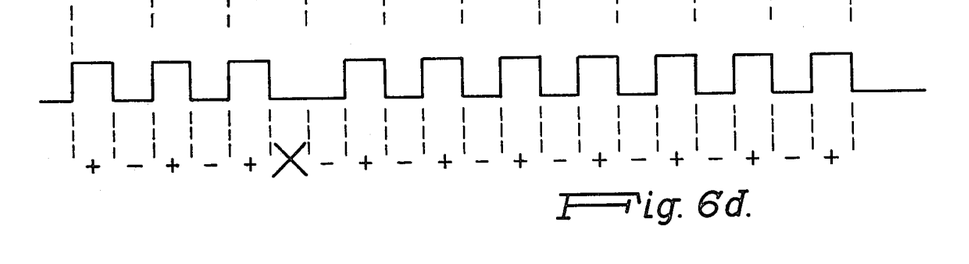

FIG. 6a shows again a typical beacon pulse having the prescribed envelope. The pulse includes 10 cycles of RF and rises to a peak at the third cycle and then descends abruptly at the fourth and subsequent cycles. FIG. 6b shows the same pulse delayed one half cycle. FIG. 6c shows the algebraic sum of the pulse and the delayed pulse revealing a phase reversal at the end of the third cycle (the peak cycle). FIG. 6d shows this summation hard limited. The sampling sequentially steps through such pulses, examining the hard limited results of the delay and add over many GRI's, shifted a few μs each GRI, until a pattern shown in FIG. 6d, + — + — + X — + — +, is found. For example, in embodiments of the present invention, the search interval is shifted 2.5 Ms each successive GRI until the desired pattern in FIG. 6d is accumulated. If, for example, the pattern is located in the accumulator, but with the X shifted to the left by two places, then the search interval is shifted forward 2×10Ms and the accumulation continues until the correct pattern shows up. On the other hand, if the pattern shows up with the X shifted two places to the right, then the search interval shifts back in time 2×10Ms until the desired pattern shows up in the accumulator. When the correct pattern does show up in the accumulator, then the track mode commences.

ACCUMULATION

Figure 7:
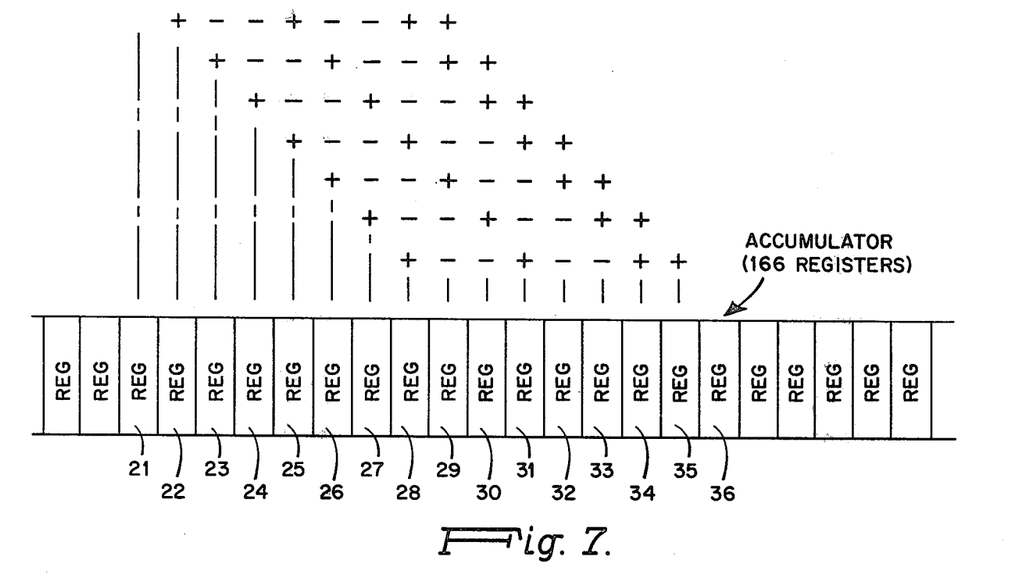
FIG. 7 is a diagram illustrating an accumulation of receiver envelope signals in some of the multitude or registers each associated with a given one of the sample points repeated each GRI, illustrating the accumulation of hits in the registers which is analyzed in accordance with a stored computer pattern to decide the results of the search mode.

The diagram of FIG. 7 illustrates accumulation during the search mode. It shows a portion of the accumulator and more particularly it shows 20 of the 166 registers, each of which is an eight stage register and accumulates the number of sampling hits that occur over a succession of GRI's. In this illustration, the accumulation is over eight GRI's and the pulse group examined is the successive Master pulse groups. For example, at the beginning of search, each of the 166 registers is looking for the phase code of the Master phase A pulse groups. That phase code, as already mentioned is + — — + — — + +. In other words, each register is looking for a serial binary word which is 1 0 0 1 0 0 1 1 and when any part of that binary number flows into the register, the register will begin to fill. Expressed in another way, each time the register is hit by the proper phase in the proper sequence it adds one and when hit enough times in this manner, it becomes full. In the illustration of FIG. 7, the registers numbered 21 through 35 have received the sequences shown alongside of them and so register 28 has been hit eight times, register 27 seven times, a register 26 six times, and so forth. Registers 29 through 35 also record hits, because only a sequence that is part of the sequence + — — + — — + + is recorded as a hit. Registers 29, 30, 31 etc. record hits of seven, six, five etc.

Clearly, for a register to be full upon examination only of Master phase A groups, sixteen GRI's must be sampled. By combining both phase A and B, this can be reduced to eight GRI's. It is only necessary to reverse the phase of alternate GRI's before examining for hits.

During the leading edge/zero crossing location mode, the accumulation is accomplished in much the same way. During that mode, the 166 registers in the accumulator record hits just as during the search mode. However, instead of the search interval shifting a few tenths of a millisecond each successive GRI, it shifts instead a few microseconds each successive GRI. Thus, instead of the search stepping from pulse to pulse of a group it steps from cycle to cycle of RF of a pulse. In either case, programmed patterns are looked for and hits are accumulated in the registers. When a sufficient number of hits is accumulated, in the proper pattern, a decision is made that the front edge/zero crossing of a pulse has been located and tracked. Then the computation of TD1 and TD2 can begin.

COMPUTER FUNCTION SEQUENCE

Figure 8:
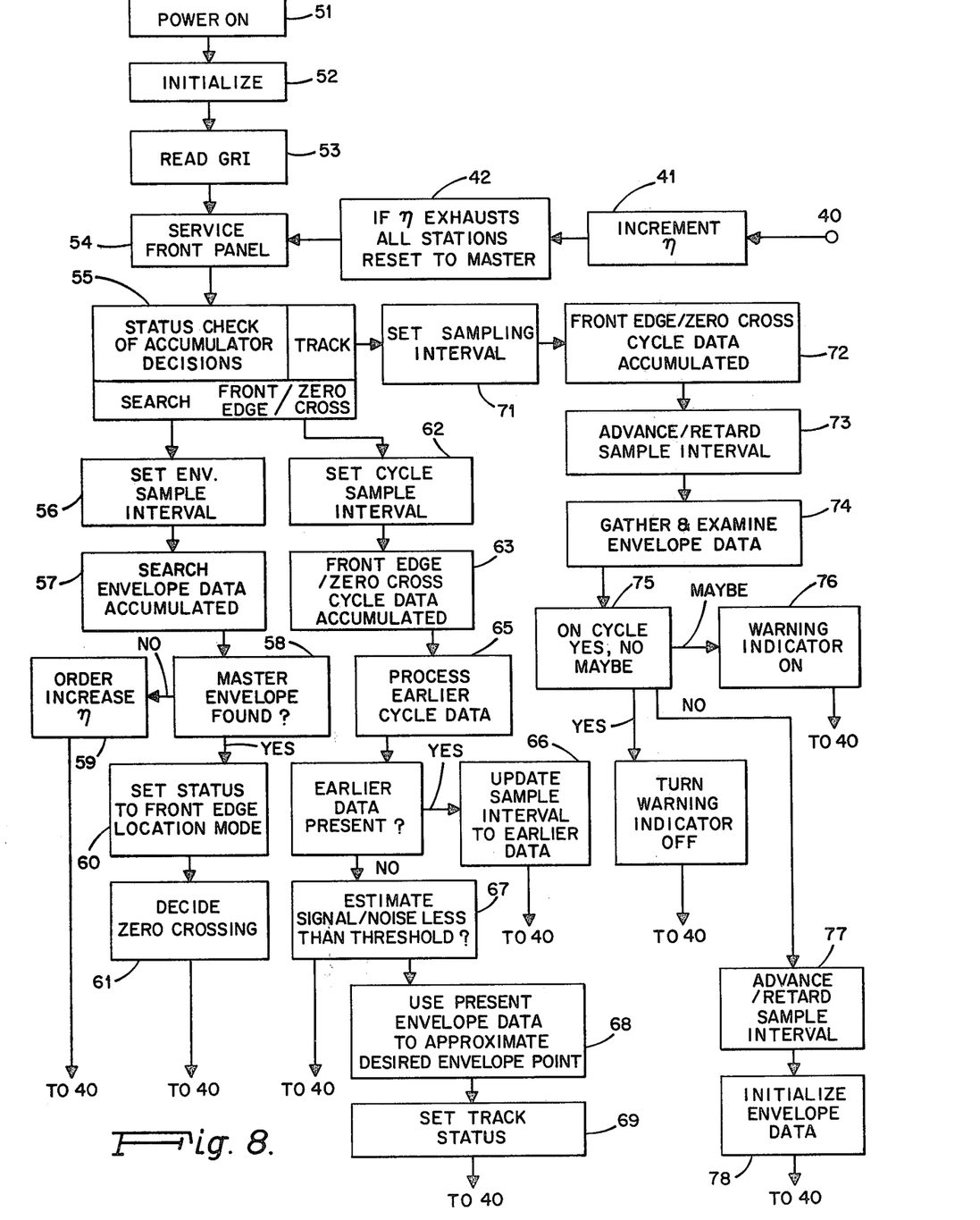
FIG. 8 is a functional block diagram of flow diagram of the integrated Loran receiver and computer in accordance with the present invention as an aid in understanding operational features of the integrated system.

FIG. 8 is a flow diagram illustrating the sequence of functions performed by the integrated receiver computer during the modes of operation. Hence, the figures is a flow diagram and is presented to aid understanding the method and structural features of the invention. The functions are described briefly in each box and are referred to hereinbelow by reference numbers.

With power on at 51, the receiver produces the cycle and envelope signals as already described. Then, upon initializing 52, the GRI is set by the operator which sets up the search interval and, next, the operator reads the GRI at 53 and services the front panel of the integrated receiver-computer at 54. This commences the search mode.

The search mode like other modes continually returns to a check of the status of the accumulator at 55, and, depending upon what is found in the accumulator, a decision is made to continue in the mode, or advance to the next mode, or return to a previous mode. At the first check of the status of the accumulator, generally, nothing is found and so the sample interval timers are automatically set at 56, in accordance with the selected GRI and then envelope data is gathered and assimulated in the accumulator. The envelope data is derived from the envelope output of the receiver and distinguishes the Master groups from the slave groups, Master phase A from Master phase B and slave phase A' from slave phase B'. The sequence is to first search for the Master and then upon finding the Master and while the front edge zero crossing of the Master is being located, search for the slave.

Next, at 58, a decision is made that the Master envelope is found or not found as indicated by a yes or no. If no, then an order from 59 is fed back to 40, increasing the number n of GRI's sampled at 41 and then checking at 42 to see if all stations are exhausted and resetting to the master. Also at 54, the panel may be serviced by selecting a new master, and then the search for the Master envelope continues and the search sample interval is advanced or retarded at 56. The search continues until 58 indicates a yes. At that point, a check of the status of the front edge/zero crossing is made of the cyel accumulator at 60. It might occur at this point that the samples are right on the zero crossing. Whether or not they are, is decided at 61 and this decision is fed back to 40. If the decision at this point is that the samples are right on the zero crossings, then the track mode is begun directly. If, on the other hand, as is the usual case, the decision is that the samples are not on the zero crossings then the front edge/zero mode crossing location mode commences Front edge/zero crossing location begins by setting the sample interval at 62, then continue accumulating envelope date at 63, just as already dine during the search mode and process earlier cycle date at 64. Next, a decision is made at 65 that the earilier envelope date is or is not present. If it is present, as indicated by a yes, then the earlier sample is maintained at 66 and this decision is fed back to 40 commencing the track mode during which continual adjustments are made to the sample interval at 71. Meanwhile, there is a gathering of both envelope and cycle date in the accumulator to insure that the desired envelope is tracked at the zero crossing.

If, on the other hand, the output of 65 is a no, then the signal to noise ratio of the tracked signal is examined at 67 and a yes or no decision is made that it is above threshold or below threshold. If it is yes, then at 68 a decision is made to use the present envelope data to position the sample interval to the approximate desired envelope point. Then at 69, the tracking status is set and the setting is fed back to 55 through 40, and the tracking mode commences. On the other hand, if the output of 67 is a no, this decision is fed back to 55 and the search mode continues.

The tracking mode begins by a decision at 55 that tracking small commence, whereupon, the sample interval is set at 71 and zero crossing data continues to be accumulated at 72. Next, depending upon the pattern accumulated revealing the zero crossing, the sample interval is advanced or retarded a few microseconds each GRI until the samples are placed right on the proper crossing. This is done at 73 where the interval is advanced or retarded, 74 where the information is accumulated and examined and 75 where the decision is made. The decision is, yes, the samples are right on the zero crossing or, no, the sample are not right on, or maybe. If, maybe, a warning indicator is turned on at 76 and this decision is fed back to 40. If yes at 77, then the warning indicator is turned off and this decision is fed back to 40. If no, then the sample interval is advanced or retarded a necessary number of microseconds to place the sample on the proper zero crossing. This decision is made at 77 and 78 and fed back to 40.

Thereafter, the proper zero crossing is continually tracked for the Master and each of the slaves and when certain tracking criteria are met by functions not shown in this diagram, the time interval between the Master and each of the slaves is computed as TD1 and TD2 and displayed to the operator. Meanwhile, the modes continue for the Master and the two slaves that form the group that is being received in accordance with the operators decision. From time to time, if the zero crossing slips slightly or, worse, if the envelope is lost, timing at 62 is triggered to shift the sample interval as necessary to get back on the right zero crossing or to begin searching again.

The functions described by the flow diagram in FIG. 8 clearly require apparatus to perform. A receiver is required to receive the transmitted beacon signals. Then, the received signals are sampled and the samples are fed to the computer where they are accumulated and examined in accordance with the computer program and the decisions outlined above are made by the computer. Then, depending on the decisions made by the computer, sampling continues or is changed one way or another until the computer decides there is adequate information to compute TD1 and TD2 and display these on the front panel observed by the operator.

All the functions shown in FIG. 8 can be performed by analog apparatus as well as digital apparatus, or by a combination of both. Hence, the apparatus contemplated by the procedure is not particularly limited to digital apparatus. However, in view of the requirements of an operable LORAN C receiver, the speed of operation required and space and cost limitations, the functions are most practically carried out by digital apparatus. The structural embodiment of the present invention described herein is made up of digital apparatus and represents the best known use of the invention.

The apparatus described herein is called an integrated LORAN C receiver-computer system. It includes four basic subsystems: the receiver subsystem 100, the envelope sampler subsystem 101, the cycle signal sampler subsystem 102, the computer and program subsystem 103 and the front panel controls and displays subsystem 104. Each of these subsystems are described in detail by FIGS. 10 through 12.

Figure 10:
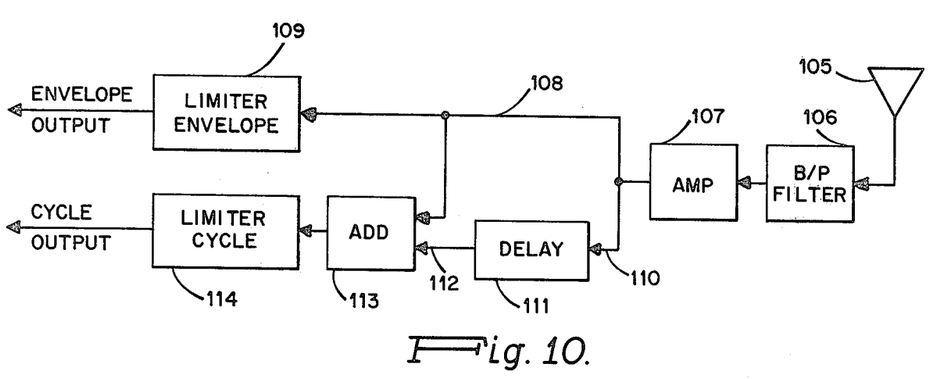
FIG. 10 is a structural block diagram showing the basic electrical parts of the receiver.

The receiver is represented by the block diagram shown in FIG. 10. It includes a suitable antenna 105 that is energized by the LORAN C beacon signals. The signals energizing the antenna are filtered by band pass filter 106 and then amplified by suitable amplifying means 107 which may include automatic gain control and another band pass filter. One output from the amplifier in line 108 is fed to hard limiter circuit 109 producing the envelope signals. The other output in line 110 is delayed by delay 111 producing a delayed signal in line 112 which is added to the signal in line 108 by adding circuit 113. The waveform of a received pulse in lines 108 and 112 is as represented by FIGS. 6a and 6b, respectively, and the output of adder circuit 113 is as represented by FIG. 6c. The output of adder circuit 113 is hard limited by limit circuit 114 producing the receiver cycle signals represented by FIG. 6d.

Figure 9:
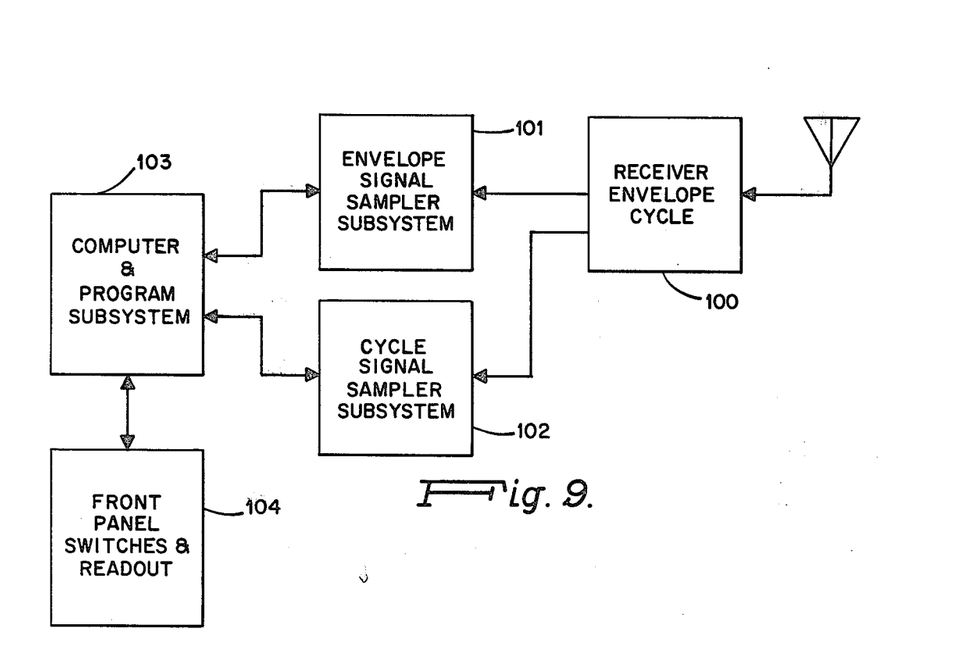
FIG. 9 is a structural block diagram showing the basic subsystems of the integrated system.
Figure 11:
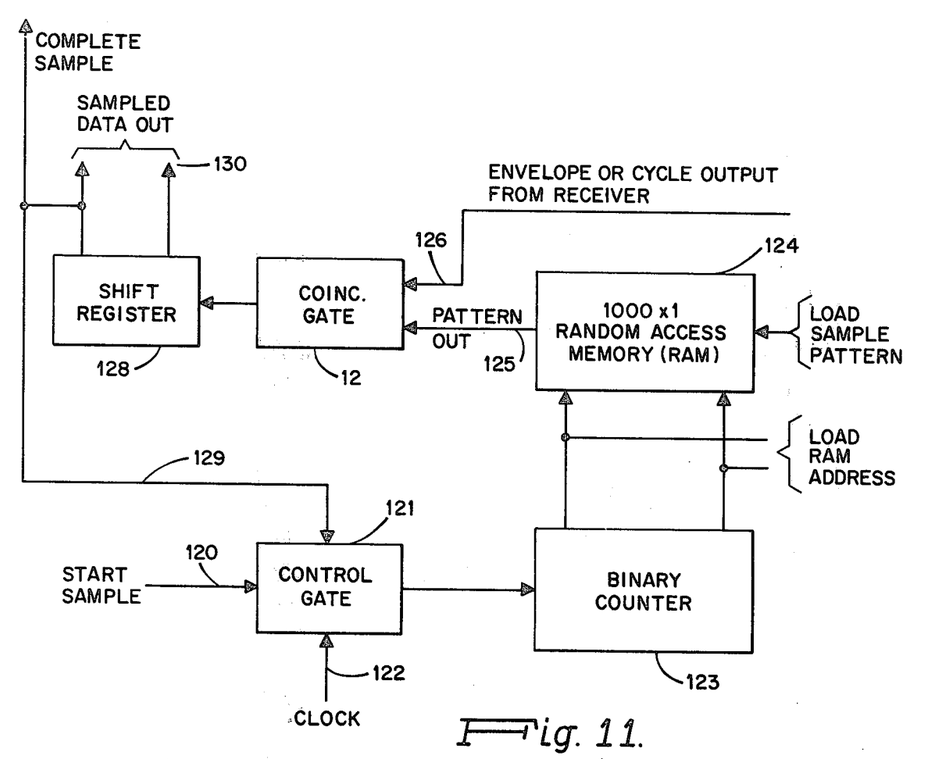
FIG. 11 is a structural block diagram showing the basic parts of the signal sampling subsystem.

FIG. 11 is a block diagram showing some details of a signal sampling subsystem, such as the envelope signal sampling subsystem 101 or the cycle signal sampling subsystem 102 of FIG. 9. Since both of these sampling subsystems include the same circuits and operate in the same manner, only one is shown in FIG. 11 and described herein. It is the envelope signal sampling subsystem. The purpose of this subsystem is to sample envelope signals from the receiver at the sample interval which is a predetermined interval that is advanced and retarded as dictated by computer. The sample interval begins at a start sample signal in line 120 fed to a control gate 121, enabling the gate so that it feeds clock pulses from line 122 to binary counter 123. The clock pulses are at 2 MHz and counter 123 counts to a thousand. Upon counting to a thousand, the output of the binary counter 123 addresses the memory of the 1000×1 random access memory (RAM) 124 every 0.5 Ms and this causes a pattern output signal from the RAM in line 125. Meanwhile, before the RAM is addressed by the output of the counter, a pattern is loaded into the RAM from the computer and program subsystem 103. Thus, each time the RAM is addressed by the output of the counter a pattern output signal in line 125 is compared with a data signal in line 126 from the envelope output of the receiver. Comparison is by coincidence gate 127 and the output of this gate feeds shift register 128. When the shift register is loaded, a signal in line 129 called the stop sample signal inhibits gate 121 to conclude the interval.

The shift register may have 200 stages and as many as 200 samples taken 0.5 Ms apart during a GRI. Each time the shift register 128 fills the sample interval stops and the contents of the shift register are spilled into the 166 registers of the accumulator in the computer and program subsystem 103.

The cycle signal sampling subsystem 102 operates just as the envelope sampling subsystem described above. It is shown in some detail in FIG. 12 along with the envelope sampling subsystem 101. The only difference is that the data sampled in line 126 is from the cycle output of the receiver and the pattern input to the RAM 124' is derived from the cycled program rather than the envelope program of the computer subsystem 103.

Figure 12:
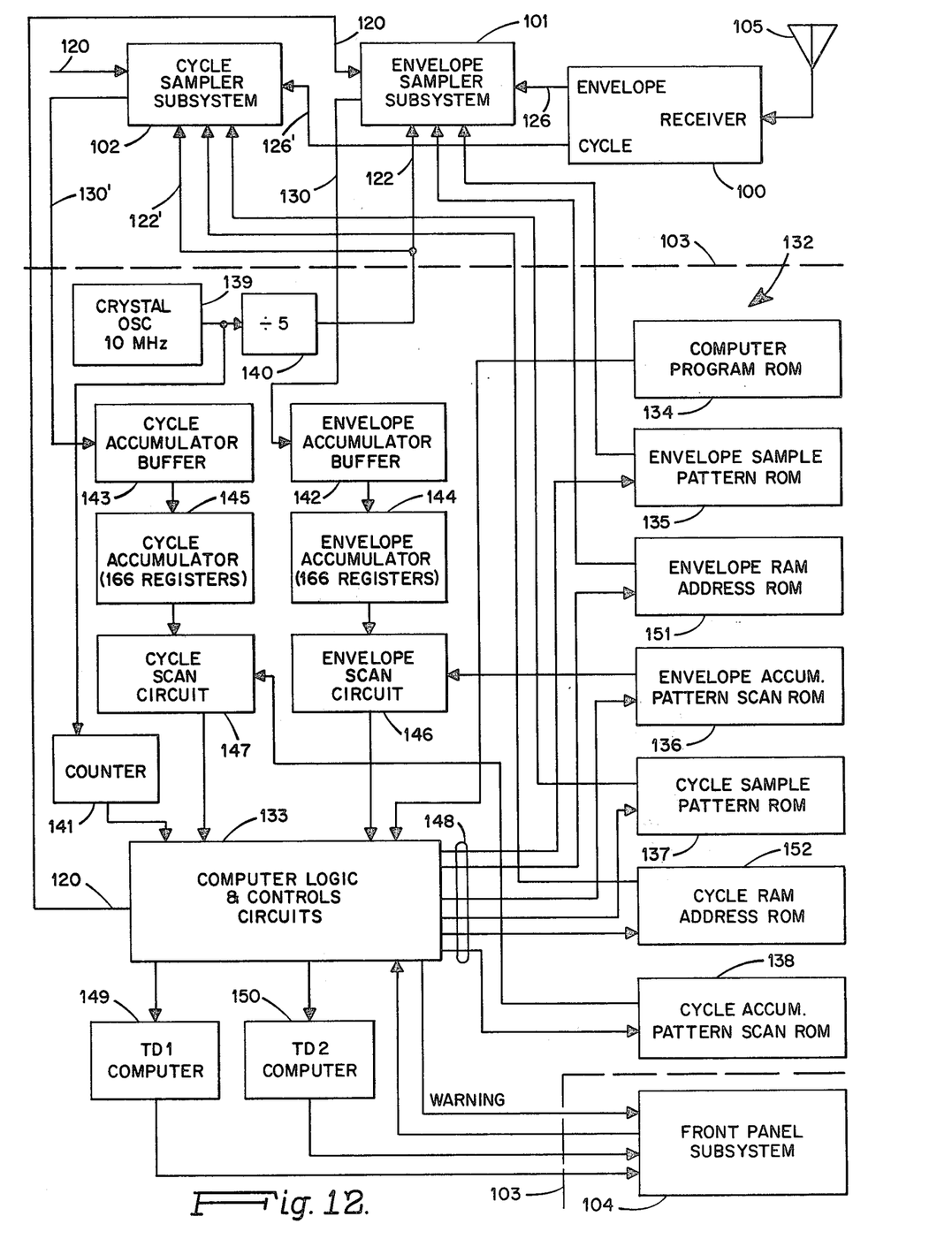
FIG. 12 is a structural block diagram showing the basic parts of the computer and stored program subsystem, the receiver and signal sampling subsystems and some of the details of interconnection between the subsystems.

A more detailed block diagram of the integrated receiver-computer system, showing particularly the principal parts of the computer and program subsystem 103, is illustrated by FIG. 12. The computer program, reference signal patterns and sampling patterns are contained in several read only memories, (ROM's) 132. More particularly, these ROM's contain the program that dictates the logic illustrated by FIG. 8. They also contain the envelope and cycle sample patterns and RAM address patterns that are fed to the envelope and cycle sampling subsystems 101 and 102. They also contain the envelope and cycle accumulator scan patterns to which the envelope and cycle accumulations are compared when scanned. These ROM's are: the computer program ROM, 134; the envelope sample pattern ROM, 135; the envelope RAM address ROM, 151; the envelope accumulator pattern scan ROM, 136; the cycle sample pattern ROM, 137; the cycle RAM address ROM, 152; and the cycle accumulator scan pattern ROM, 138.

Sampling and computer timing is derived from a 10 MHz crystal controlled oscillator 139. The 10 MHz pulses devived from this oscillator are divided by five by 140, producing the 2 MHz pulses fed to the sampling subsystems 101 and 102. The 10 MHz pulses are also fed to the timing pulse generator 141 which produces timing signals for the system including the GRI and the sample interval and these timing signals are fed to the computer logic and control circuits 133 that performs the mathematical functions illustrated in FIG. 8. Hence, all timing in the total system is derived from the 10 MHz pulses.

The computer subsystem 103 also contains the envelope and cycle accumulators and scanners for comparing the accumulated information with stored information from the ROM's. The sampled envelope signals from shift register 128 of the envelope sampling subsystem 101 are fed to the envelope buffer register 142. Similarly the sampled cycle signals from register 128' of the cycle sampling subsystem 102 are fed to cycle buffer 143. These buffers feed their corresponding accumulators, the envelope and cycle accumulators 144 and 145. Each accumulator includes 166 eight stage registers, wherein hits are accumulated.

While the accumulation is proceeding, it is compared with the stored reference patterns from the ROM's More particularly, the envelope accumulation in 144 is compared with envelope patterns from ROM 136. This comparison is made in the envelope accumulation scan circuits 146. Similarly the cycle accumulation is compared with cycle reference patterns from ROM 138 in cycle accumulation scan 147. Both the envelope and the cycle reference patterns from appropriate ROM's are summoned up to scan the accumulations by signals from the computer logic and control system 133 in lines 148 from control circuits 133.

In operation, during the search mode, significant accumulation occurs in the envelope accumulator 144. When this accumulation compares favorably with the stored envelope reference pattern from ROM 136, the search mode is completed and the front edge/zero crossing location mode commences, or if it has already commenced it continues. Then, when the cycle accumulation in 145 compares favorably with the cycle pattern from ROM 138, the tracking mode can commence. If these comparisons are not favorable, the sample interval start signal in line 120 that initiates sampling in both samplers 101 and 102 is advanced or retarded according to the computer program to perform the functions outlined in FIG. 8.

As soon as the tracking mode commences, the computer logic system 133 initiates computation of TD1 and TD2 by 149 and 150. These values are computed and displayed on the front panel of the integrated receiver computer. If during tracking either the envelope of cycle accumulation does not compare favorably with the stored patterns, then the cycles start signal is advanced or retarded and the search or zero crossing location modes are repeated. Thus, the integrated system continues during the tracking mode to accumulate information on the envelope and the cycle and at the same time continually computes TD1 and TD2. If at any time, the accumulated information does not compare favorably with the stored information, then warning indications on the front panel are initiated to alert the operator. For example, the operator is warned that the indicated values of TD1 and TD2 last computed reliably may no longer be reliable.

CONCLUSION

The method and apparatus described herein incorporate several novel features that have been particularly identified. They include the techniques of sampling the envelope and cycle outputs of the LORAN C receiver and the technique of accumulating the samples over many GRI's so that each sample position is a member of a multitude of GRI's and so is used many times. These techniques are incorporated in the apparatus described herein that represents the best known use and application of the invention. The invention includes the process and the apparatus and claims to both the process and the apparatus are included. It is clear that the apparatus claimed in relation to a LORAN system can be used only in accordance with the process claimed. However, the process could apply to other apparatus such as electrical analog apparatus or a hybrid of analog and digital apparatus. Furthermore, various modifications and alterations of the process and apparatus described herein could be made by those skilled in the art without deviating from the spirit and scope of the invention as set forth in the appended claims.

What is claimed is:

1. A system for receiving and identifying groups of signals that are repeatedly transmitted during successive transmit intervals comprising,
   (a) means for receiving the groups of signals during successive receive intervals that correspond to the successive transmit intervals,
   (b) means for sampling the output of the receiver means at successive sampling times 1, 2, 3---N during each different receive interval,
   (c) each sampling time during each receive interval having a corresponding sampling time during each other receive interval,
   (d) N separate accumulating means, each for accumulating a characteristic of the received signal at corresponding samples taken during different receive intervals,
   (e) a source of references, and
   (f) means for comparing the accumulations with the references to inititate an indication of reception of the groups of signals.

2. A system for receiving and identifying the time of reception of coded groups of signals that are repeatedly transmitted during successive transmit intervals comprising,
   (a) means for receiving the coded groups of signals during successive receive intervals that correspond in duration and succession to the successive transmit intervals,
   (b) means for sampling the output of the receiver means at successive sampling times 1, 2, 3---N, during each different receive interval.
   (c) each sampling time during each receive interval having a corresponding sampling time during each other receive interval,
   (d) N separate accumulating means, each for accumulating a characteristic of the received signals at corresponding samples taken during different receive intervals,
   (e) a source of references and
   (f) means for comparing the accumulations with the references to inititate an indication of the time of arrival of the coded groups of signals.

3. A system as in claim 2 wherein,
   (a) the successive receive intervals are equal.

4. A system as in claim 3 wherein,
   (a) the successive receive intervals are regular.

5. A system as in claim 4 wherein,
   (a) the groups of signals are groups of radio frequency (RF) pulses.

6. A system as in claim 2 wherein,
   (a) sampling times 1, 2, 3---N are regular.

7. A system as in claim 6 wherein,
   (a) the rate of such sampling is greater than the rate of transmitted signals in a group.

8. A system as in claim 7 wherein,
   (a) the successive receive intervals are equal and regular,
   (b) the sampling times 1, 2, 3---N are regular and,
   (c) the rate of said sampling is greater than the rate of the transmitted signals in a group.

9. A system as in claim 2 wherein,
   (a) the successive receive intervals are regular and
   (b) the interval of time of each sample is less than a half cycle of the RF.

10. A system as in claim 9 wherein,
    (a) the successive receive intervals are equal,
    (b) the sampling times 1, 2, 3---N are regular and
    (c) the rate of sampling is greater than the rate of the transmitted signals in a group.

11. A system as in claim 10 wherein,
    (a) the successive receive intervals are regular and equal in duration.

12. A system as in claim 11 wherein,
    (a) the transmitted RF pulses in each group are at regular times and have equal envelopes.

13. A system as in claim 12 wherein,
    (a) the transmitted pulses contain an equal number of cycles of RF.

14. A system as in claim 13 wherein,
    (a) groups of transmitted pulses are phase coded as the phase of the RF from pulse to pulse in one group is not the same as in another group.

15. A system as in claim 14 wherein,
    (a) each pulse in a group has plus or minus phase and so the phase code of a group is a series of plus and minus, and
    (b) the phase code of each group is the inverse of the previous group.

16. A system as in claim 2 wherein,
    (a) the references bear a predetermined relationship to the code of the groups of transmitted signals.

17. A method of identifying the time of arrival at a receiver of coded groups of signals that are repeatedly transmitted during successive transmit intervals including the steps of:
  (a) receiving the transmitted signals,
  (b) sampling the received signals at successive sampling times 1, 2, 3---N during successive receive intervals that correspond to the successive transmit intervals,
  (c) said sampling times being such that each sampling time has a corresponding sampling time during each successive receive interval,
  (d) accumulating a characteristic of the received signals at corresponding intervals taken at different receive intervals,
  (e) comparing the accumulations with predetermined references, and
  (f) indicating the time of arrival at the receiver of the received signals whose accumulated characteristics compare with the references within a predetermined range.

18. A method as in claim 17 wherein,
  (a) the successive receive intervals are equal and regular,
  (b) the sampling times 1, 2,---N are regular, and
  (c) the rate of said sampling is greater than the rate of the transmitted signals in a group.

19. A method as in claim 18 wherein,
  (a) the groups of signals are groups of radio frequency (RF) pulses, and
  (b) the interval of each time sample is less than a half cycle of the RF.

20. A method as in claim 19 wherein,
  (a) the transmitted RF pulses in each group are at regular times, have equal envelopes and contain an equal number of cycles of the RF.

21. A method as in claim 20 wherein,
  (a) the groups of transmitted pulses are phase coded in that the phase of the RF from pulse to pulse in one group is not the same as in the following group, and
  (b) the phase code of each group is the inverse of the previous group.

22. In a system for searching incoming signals for a distinct incoming signal pattern, means for sequentially sampling incoming signals at each of programmed sequential intervals to find said pattern comprising,
  (a) a source of said incoming signals,
  (b) a random access memory having an address input and an output,
  (c) said memory producing an output of its content when the content is addressed,
  (d) means for loading the memory with at least one sequential interval program,
  (e) a binary counter having an input and an output,
  (f) means for coupling the output of the counter to the memory address,
  (g) a source of timing signals feeding the input of the counter,
  (h) means responsive simultaneously to the output of the memory and the incoming signals for producing samples of the incoming signals as dictated by said memory output, and
  (i) utilization means responsive to the samples.

23. A system as in claim 22 and further including,
  (a) means for converting the incoming signals to binary data signals,
  (b) whereby the samples produced are samples of said binary data signals.

24. A system as in claim 22 wherein,
  (a) the sequential interval program is a program of binary signals.

25. A system as in claim 1 wherein,
  (a) means are provided for comparing the magnitude of each sample with a threshold signal level producing a binary signal indicative of whether or not the sample magnitude exceeds the threshold signal level and
  (b) said binary signals are accumulated in said N separate accumulating means.

26. A system as in claim 25 wherein, the binary signal is a plus or minus signal level indicating whether the sample magnitude exceeds the threshold or is less than the threshold.

27. A system as in claim 2 wherein,
  (a) means are provided for comparing the magnitude of each sample with a threshold signal level producing a binary signal indicative of whether or not the sample magnitude exceeds the threshold signal level and
  (b) said binary signals are accumulated in said N separate accumulating means.

28. A system as in claim 27 wherein, the binary signal is a plus or minus signal level indicating whether the sample magnitude exceeds the threshold or is less than the threshold.

29. A system as in claim 2 wherein:
  (a) means are provided for controlling the sequence of operation of the system, the sequence being, first the signal search mode, then the signal front edge - zero crossing mode and then the signal zero crossing track mode; and
  (b) said means for comparing accumulations with the references provides an output signal to said means for controlling that indicator completion of the pulse search mode.

30. In a Loran Receiver that receives radio frequency (RF) signals from a master beacon and at least two slave beacons that repeatedly transmit coded groups of signals and converts the received signals into hyperbolic coordinates that locate the position of the receiver with respect to the beacons and a programmed computer controls modes and sequences of operation of the system, these modes being generally, first, the beacon pulse search mode, then the front edge/zero crossing location mode and then the zero crossing track mode, each mode being performed to search and track a predetermined zero crossing of the RF of received pulses from the master and slave beacons, the imrovement comprising,
  (a) means for sampling the received signals repeatedly at the beacon group repetition interval (GRI) in a regular sampling pattern in which the sampling rate is greater than the beacon pulse rate, each sample interval being only a small portion of a beacon pulse RF excursion.
  (b) means for limiting each sample and producing a signal value of plus or minus therefore, depending upon whether the sample exceeds a threshold,
  (c) means for accumulating these plus or minus values
  (d) means for comparing the accumulations with reference values and signalling when there is correclation with the reference values and
  (e) means responsive thereto for initiating the next mode, (f) thereby, locating the samples at the zero crossing of a particular RF excursion of the tracked beacon pulses.

31. A Loran Receiver as in claim 31 wherein
   (a) means are provided for tracking the zero crossings of received signals so located until all three beacon signals, the master and the two slaves are found and the predetermined zero crossing of each is tracked and
   (b) means are provided for determining the time differences of arrival of the tracked zero crossings of the slave beacon signals (TD1 and TD2) with reference to the tracked zero crossings of the master signals
   (c) means are provided for displaying signals representative of TD1 and TD2, as representations of hyperbolic lines on a map that intersect at the receiver.

32. In a Loran Receiver that receives radio frequency (RF) signals from a master beacon and at least two slave beacons that repeatedly transmit coded groups of signals and converts the received signals into hyperbolic coordinates that locate the position of the receiver with respect to the beacons and a programmed computer controls modes and sequences of operation of the system, these modes being generally, first, the beacon pulse search mode, then the front edge/zero crossing location mode and then the zero crossing track mode, each mode being performed to search and track a predetermined zero crossing of the RF of received pulses from the master and slave beacons, the process comprising the steps of:
   (a) sampling the received signals repeatedly at the beacon group repetition interval (GRI) in a regular sampling pattern in which the sampling rate is greater that the beacon pulse rate, each sample interval being only a small portion of a beacon pulse RF excursion.
   (b) producing a signal value of plus or minus for each sample, depending upon whether the sample exceeds a threshold,
   (c) accumulating these plus or minus values
   (d) comparing the accumulations with reference values and signalling when there is correlation with the reference values and
   (e) then initiating the next mode,
   (f) thereby, locating the samples at the zero crossing of a particular RF excursion of the tracked beacon pulses.

33. The process in a Loran Receiver as in claim 32 wherein,
   (a) the zero crossings of a particular, RF excursion of received signals are tracked until all three beacon signals, the master and the two slaves are found and the particular zero crossing of each is tracked and
   (b) then the time difference of arrival of the tracked zero crossings of the slave beacon signals (TD1 and TD2) are determined with reference to the tracked zero crossings of the master signals and
   (c) signals representative of TD1 and TD2 are displayed as representations of hyperbolic lines on a map that intersect at the receiver.

* * * * *